(12) United States Patent
Ilyashenko

(10) Patent No.: US 6,602,448 B1
(45) Date of Patent: Aug. 5, 2003

(54) GRADED PLASTIC OPTICAL ELEMENT AND METHOD FOR PRODUCING THEREOF

(75) Inventor: Victor Ilyashenko, Northborough, MA (US)

(73) Assignee: GetronicsWang Co., LLC, Billerica, MA (US)

( * ) Notice: Subject to any disclaimer, the term of this patent is extended or adjusted under 35 U.S.C. 154(b) by 0 days.

(21) Appl. No.: 09/461,482

(22) Filed: Dec. 14, 1999

(51) Int. Cl.⁷ .............................................. B23D 11/00
(52) U.S. Cl. ....................................... 264/1.24; 264/2.7
(58) Field of Search ............................... 264/1.1, 1.24, 264/1.29, 1.7, 2.6, 2.7

(56) References Cited

U.S. PATENT DOCUMENTS

| | | | | |
|---|---|---|---|---|
| 3,718,383 A | * | 2/1973 | Moore .......................... | 264/1.7 |
| 5,253,323 A | | 10/1993 | Koike et al. ................. | 385/143 |
| 5,541,247 A | | 7/1996 | Koike .......................... | 524/285 |
| 5,593,621 A | | 1/1997 | Koike et al. ................. | 264/1.29 |
| 5,760,139 A | | 6/1998 | Koike et al. ................. | 525/200 |
| 5,763,514 A | | 6/1998 | Koike .......................... | 525/265 |
| 5,767,200 A | | 6/1998 | Koike .......................... | 525/265 |
| 5,783,636 A | | 7/1998 | Koike et al. ................. | 525/199 |
| 5,916,971 A | | 6/1999 | Koike et al. ................. | 525/197 |
| 6,086,999 A | * | 7/2000 | Ilyashenko | |

FOREIGN PATENT DOCUMENTS

| | | |
|---|---|---|
| EP | 0710855 A1 | 5/1996 |
| WO | 615141 | 8/1993 |

* cited by examiner

*Primary Examiner*—Mathieu D. Vargot
(74) *Attorney, Agent, or Firm*—Reza Mollaaghababa; Thomas J. Engellenner; Nutter McClennen & Fish LLP

(57) ABSTRACT

The present invention provides a method for forming a transparent optical element, such as an optical fiber, having a graded index of refraction. One preferred practice of the invention employs a hollow tube formed of an amorphous fluoropolymer and fills the tube with a liquid dopant material having an index of refraction that is different than that of the fluoropolymer. The heating of the filled tube for a sufficient duration causes the diffusion of the dopant material through the fluoropolymer, thereby producing a graded distribution of the dopant and hence a graded refractive index.

16 Claims, 4 Drawing Sheets

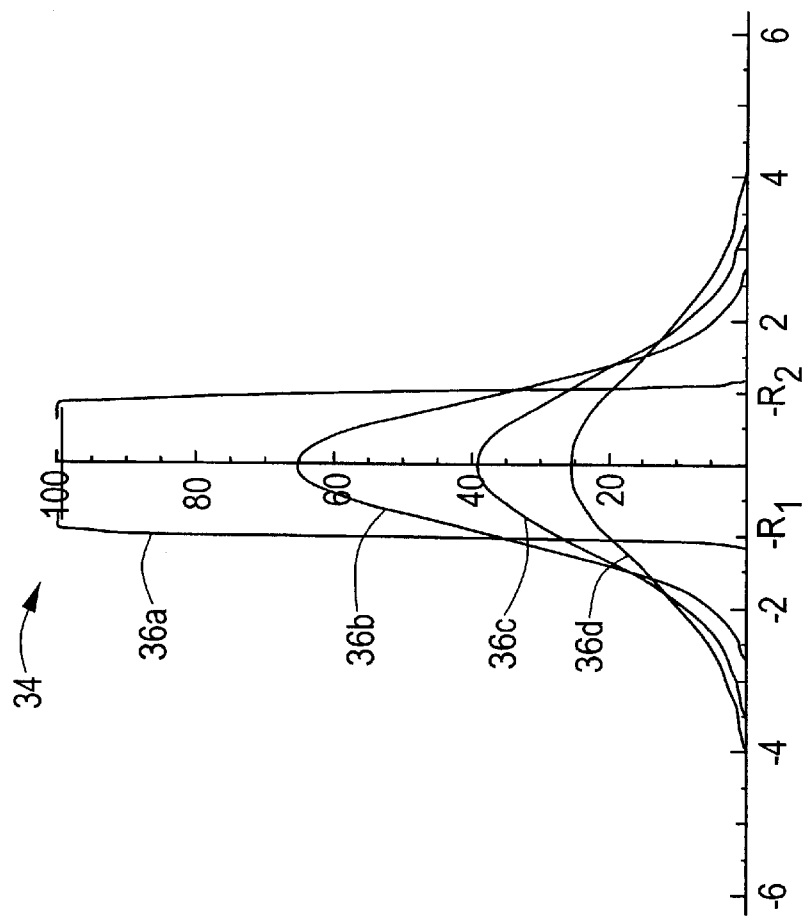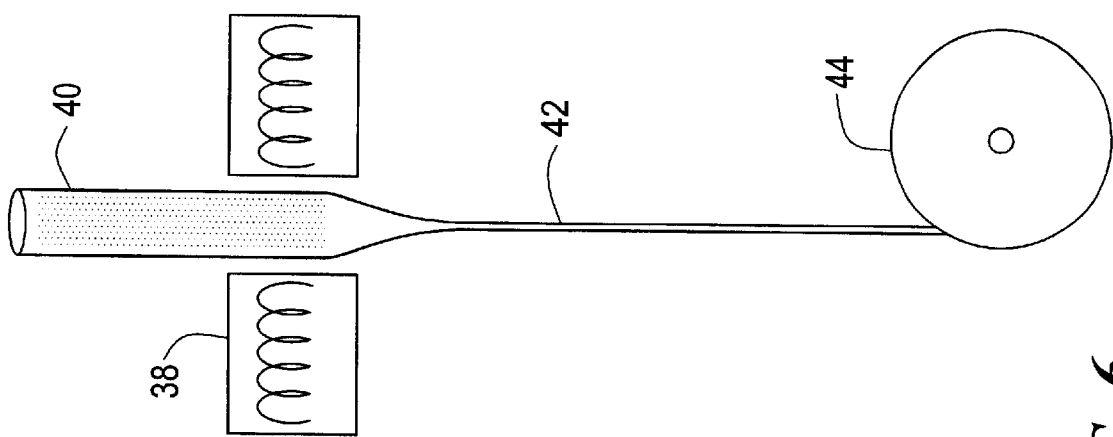

GRADED PLASTIC OPTICAL ELEMENT AND METHOD FOR PRODUCING THEREOF

BACKGROUND OF THE INVENTION

The present invention relates generally to optical fibers having graded index of refraction. More particularly, the invention relates to a method for forming an optical fiber having a graded index of refraction in the core and having high light transparency.

Step-indexed and gradient glass optical fibers typically have small diameters which render their connections to other parts of a communication system labor-intensive and cumbersome. In particular, connection of such glass fibers to another part of a system requires critical alignment of the fiber with a tolerance in the range of a few microns. A step-indexed fiber typically includes a core having a particular index of refraction surrounded by a cladding having a different index of refraction. Hence, a step-indexed fiber has a sharp discontinuity in the index of refraction at the boundary between the core and the cladding. Such step-indexed glass fibers generally have relatively low bandwidths, and hence are not suitable for many applications that require high rates of data transmission.

Further, plastics optical fibers including fibers having a gradient index of refraction with a particular shape are known. In contrast to step-indexed fibers, the index of refraction in fibers having a gradient index of refraction varies continuously in one direction, typically in a direction perpendicular to the longitudinal axis of the fiber, rather than having a sharp discontinuity. Such a refractive index gradient has typically a cylindrical symmetry and an approximately parabolic shape. Conventional plastic optical fibers are usually made of an amorphous polymer such as poly (methyl methacrylate) (PMMA). Such plastics fibers can be formed to have relatively large diameters, and can be employed for multi-mode transmission of data. These conventional plastics fibers, however, typically exhibit relatively large absorption coefficients in the infrared region of the electromagnetic spectrum, thereby limiting their applications in this region the spectrum. Further, such fibers can not be reliably employed at high temperatures and/or in humid environments.

U.S. Pat. No. 5,916,971 describes a graded refractive index fiber that is formed of an amorphous fluoropolymer and doped with a dopant material having a refractive index different from that of the fluoropolymer. The dopant material is said to be distributed within the amorphous fluoropolymer so as to produce the graded refractive index. The preferred method described in this patent for producing such a fiber includes producing a hollow tube formed of the fluoropolymer material and inserting a rod formed of the fluoropolymer material and the dopant material into the hollow tube. Heat fusing the rod with the tube produces the final distribution of refractive index across the tube. The insertion of the rod into the hollow tube requires producing the cavity in the tube with precise dimensions, thus adding to the cost and the time of the manufacturing process. Further, the distribution of the dopant material in the rod may not be uniform, and may not be the same for different rods, thus adversely affecting the reproducibility of the refractive-index gradient in the optical fiber and the quality of the gradient. In addition, there is a possibility of forming defects at the boundary between the rod and the tube upon heat fusion of the rod with the tube. Further, this process may not reliably secure the rod to the tube. That is, there is a possibility that the core splits from the cladding in the fiber.

Accordingly, it is an object of the present invention to provide a method for forming an optical fiber that is transparent over a wide range of the electromagnetic spectrum and is capable of efficient multi-modal transmission of optical data.

It is another object of the invention to provide a method for forming an optical fiber that can be employed for multi-modal transmission of digital optical data.

It is yet another object of the invention to provide a method that can reproducibly form an optical fiber having a graded refractive index.

SUMMARY OF THE INVENTION

The present invention provides a method of forming an optical fiber having a graded index of refraction in a plane perpendicular to its longitudinal axis. The term graded index of refraction as used herein refers to an index of refraction that varies continuously in a particular direction. The method the invention includes a step of providing a tube formed of an amorphous fluoropolymer having a first index of refraction. The tube has a longitudinal axis and a radial axis perpendicular to the longitudinal axis, and further includes a bore that extends along the longitudinal axis with an opening at an end thereof. The term "tube" as used herein can refer to a number of different structures which have a hollow interior portion open at one or both ends. The tube preferably has a circular cross section. Alternatively, the tube can be selected to have other shapes, such as parallelepiped or trapezoidal shape.

The method of the invention includes a step of filling the bore, formed in the tube with a liquid dopant material having a second index of refraction different from the first index of refraction to form a raw preform. The raw preform is heated for a sufficient duration to cause diffusion of the dopant material in the direction of the radial axis to form the desired graded refractive index. The heating of the raw preform further provides diffusion of the fluoropolymer into the filled bore to fuse the bore and form a finished preform having a core with the desired refractive index.

The finished preform may be drawn to produce an optical fiber having the graded index of refraction.

The bore is typically centrally located, and may have two openings at its opposed ends, each of which provides access to the space within the bore. The diameter of the bore can be selected to be a few millimeters, for example, one to two millimeters. If the bore has two openings, a plastic jacket can be placed around at least a portion of the tube, and clamped at one end to close one opening, thereby allowing filling of the bore with the liquid dopant material.

The amorphous fluoropolymer employed for forming the tube can be selected from a family of copolymers having selected ratios of polytetrafluroethylene (PTFE) and 2,2-bis (trifuoromethyl)-4,5-difluoro-1,3-dioxole. The dopant material is preferably an oligomer of trifluorochloroethylene.

When a copolymer of PTFE and 2,2-bis(trifuoromethyl)-4,5-difluoro-1,3-dioxol is employed to form the tube and triflurochloroethylene is employed as the liquid dopant material, the raw preform is heated to a temperature in a range of approximately 30° C. above the glass transition of the copolymer, and is maintained at this temperature for a sufficient time, e.g., in the range of approximately 200 to 500 hours depending on the transport properties of the dopant and the desired configuration of the preform, such as core to cladding ratio, preform diameter and the numerical aperture. The heating of the preform causes diffusion of the liquid dopant in a radial direction to provide a graded distribution of the dopant material in the radial direction, and to fuse the core with the fluoropolymer tube. Because, the dopant material has an index of refraction that is different from the index of refraction of the fluoropolymer, the graded radial distribution of the dopant material leads to a graded refractive index in the finished preform. Those skilled in the art will appreciate that the method of the invention is not limited to fluoropolymers. In particular, any amorphous polymer/copolymer can be utilized in the method of the invention to form an optical fiber.

Another aspect of the invention provides a method for forming a transparent element having a graded refractive index. The method includes a first step of providing a tube of an amorphous fluoropolymer having a first index of refraction, and having a longitudinal axis and radial axis, and further having a bore extending along the longitudinal axis. The bore is formed to have at least one opening at one end thereof. Again, the bore is filled with a liquid dopant material having a second index of refraction which differs from the first index of refraction to form a raw preform. The raw preform is heated for a sufficient duration to provide diffusion of the dopant material in the direction of the radial axis to form the graded refractive index. The heating provides a sufficient flux of the fluoropolymer into the filled bore to fuse the filled bore, thereby forming the transparent element with a core having the graded refractive index.

A further aspect of the present invention provides an optical fiber by first extruding an amorphous fluoropolymer to form a preform having a longitudinal axis and a radial axis, and further having a core extending along the longitudinal axis. The core has at least an opening that allows introducing a liquid dopant material into the volume subtended by the core, to form a raw preform. The dopant material is selected to have an index of refraction that is different from the index of refraction of the fluoropolymer. After introduction of the dopant into the core, the raw preform is heated for a sufficient duration to provide diffusion of the dopant material in the direction of the radial axis to form the graded refractive index. The heating of the preform further provides a sufficient flux of the fluoropolymer into the filled bore to fuse the filled bore, thereby forming a finished preform with a core having the graded refractive index. In a final step, the finished preform is drawn to form an optical fiber having the graded index of refraction.

In still another aspect, the present invention provides an optical fiber and/or a transparent element produced by any of the above recited methods.

Illustrative embodiments of the invention will be described below with reference to the following drawings.

BRIEF DESCRIPTION OF THE DRAWINGS

FIG. 5 illustrates a plurality of curves that schematically depict the diffusion of the dopant material as the heating of the preform progresses;

FIG. 6 schematically illustrates drawing an optical fiber from the finished preform;

DETAILED DESCRIPTION

The present invention provides a method for producing an optical fiber with a graded index of refraction that varies continuously in a selected direction. The optical fiber is formed of an amorphous fluoropolymer to render the fiber transparent to radiation over a wide range of the electromagnetic spectrum, e.g., in a range from ultraviolet to infrared. A dopant material, introduced into the fluoropolymer with a graded distribution, as discussed below, provides the fiber with a graded refractive index. The graded refractive index advantageously substantially eliminates modal dispersion in a multi-mode operation of the fiber, thus providing the fiber with a large bandwidth for transmission of data at a high rate. For example, a fiber formed according to the invention can be employed to transmit data at a rate of a few Gigabits per seconds.

Figure 1:
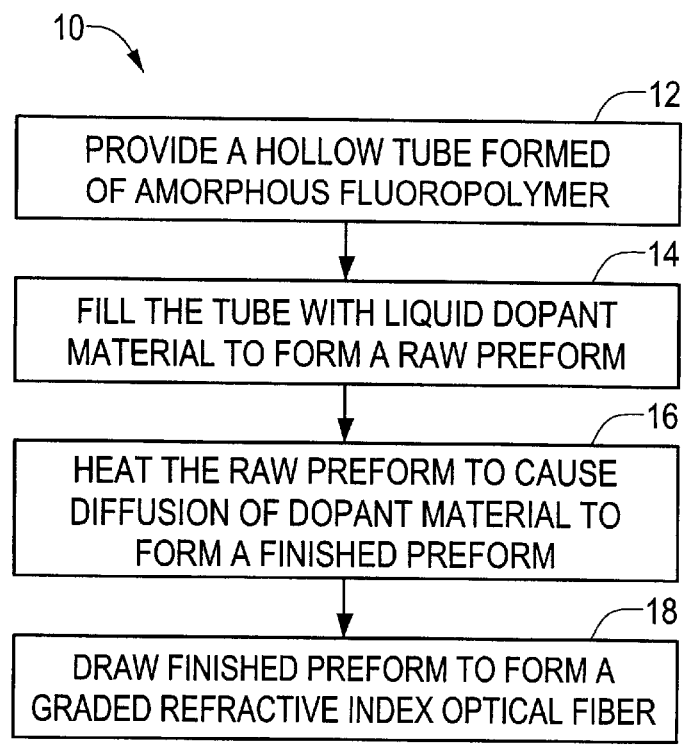
FIG. 1 is a flow chart depicting the various steps of a method according to the invention for forming a graded-refractive index optical fiber.

FIG. 1 illustrates a flowchart 10 depicting the various steps of forming a graded-refractive index optical fiber in accord with a preferred method of the present invention. In step 12, a tube formed of an amorphous fluoropolymer, preferably selected to be a copolymer of polytetrafluroroethylene and 2,2-bis(trifuoromethyl)-4,5-difluoro-1,3-dioxol with a selected melting temperature, having a particular index of refraction is provided. The tube has a longitudinal axis and a radial axis, and is selected to have a bore extending along its longitudinal axis. In subsequent step 14, the bore is filled with a liquid dopant material having an index of refraction that is different, for example larger, than the index of refraction of the tube, to form a raw preform. The dopant material, for example, can be selected to be an oligomer of trifluorchloroethylene. In step 16, the raw preform is heated for a sufficient duration to cause diffusion of the dopant material in the direction of the radial axis of the raw preform, to form a finished preform having a graded-refractive index in the radial direction. In final step 18, the finished preform is drawn to create an optical fiber having the graded-refractive index.

Figure 2:
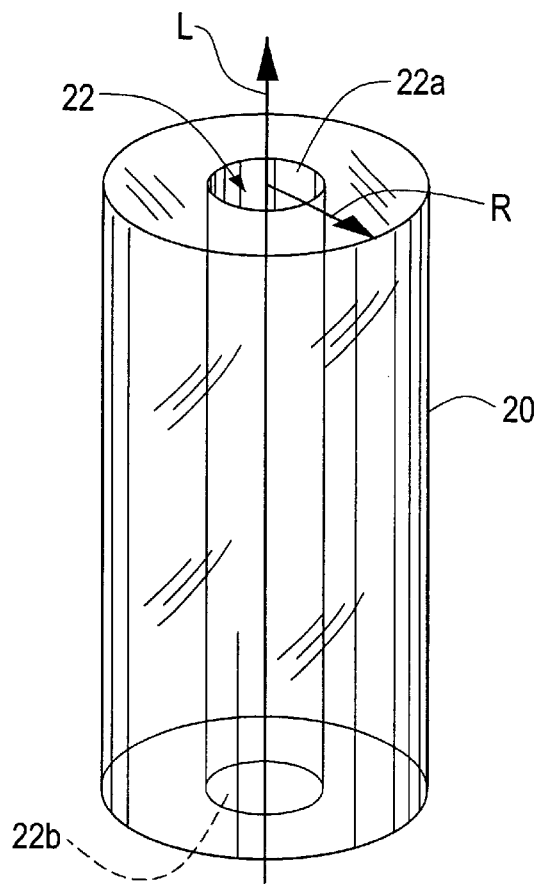
FIG. 2 is a perspective view of a tube formed of an amorphous fluoropolymer and having a bore along its longitudinal axis, to be employed in the method of the invention.

With reference to FIG. 2, an illustrative tube 20 to be utilized in the method of the invention is formed of an amorphous fluoropolymer, selected to be substantially free of C—H bonds. For example, a copolymer of PTFE and 2,2-bis(trifuoromethyl)-4,5-difluoro-1,3-dioxol can be employed to form the tube 20. Polymeric materials typically include C—H bonds which exhibit vibrational and deformation bands in the near infrared region of the electromagnetic spectrum, and hence cause absorption loss in this region. Thus, selecting the amorphous fluoropolymer for forming the tube 20 to be substantially free of free C—H bonds advantageously reduces the absorption coefficient of the tube 20 in the infrared region of the electromagnetic spectrum, for example in the wavelength range from 600 to 1550 nm. The lower absorption coefficient in turn enhances the transparency of an optical fiber to be made from the tube 20, as described below, in such a wavelength region. Further, employing an amorphous fluoropolymer in the present invention rather than a crystalline fluororesin advantageously eliminates light scattering from various crystalline domains of a crystalline resin, to further enhance the transparency of an optical fiber to be formed according to the method of the invention.

The illustrated tube 20 has a longitudinal axis L and a radial axis R, and further includes a bore 22 that extends along the longitudinal axis L. For a tube that is approximately 50 to 500 millimeters long, the diameter of the bore 22 is preferably selected to be a few millimeters, e.g., one to two millimeters. The selection of the diameter of bore 22 depends on a number of factors including the diameter of tube 20, the desired core size of the optical fiber to be formed, the transport properties of the dopant material, and can be approximately determined based on the modeling of the diffusion process. The illustrated bore 22 has two openings 22a and 22b at its two ends which provide access to the space within the bore 22. Although the illustrated tube 20 has a circular cross-section, those skilled in the art will understand that it is possible to choose other shapes, such as triangular or polygonal, for the cross-section of the tube 20. Further, the bore 22 can be configured to have only one opening to the external environment rather than the two illustrated openings 22a and 22b.

A number of different techniques can be employed to form the illustrated tube 20. One preferred practice of the invention employs an extrusion process, utilizing standard extrusion and tooling equipment, to create tube 20. Alternatively, tube 20 can be formed by injection molding, casting, and spin casting. In an extrusion process, a powder of a selected fluoropolymer, such those available from Dupont Company of Delaware, U.S.A under the trade designations Teflon AF1600 or Teflon AF 2400, is fed into the extruder machine and is extruded to form the tube 20.

Figure 3:
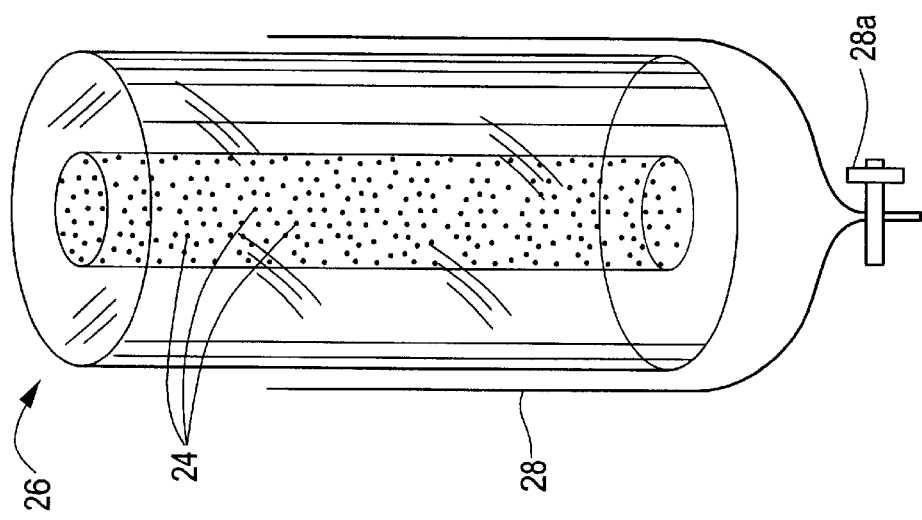
FIG. 3 is another perspective view of the tube of FIG. 2 placed within a jacket so the bore can be filled with a liquid dopant material according to the teachings of the present invention to form a raw preform.

With reference to FIG. 3, after forming or obtaining the tube 20, the bore 22 of tube 20 is filled with a liquid dopant material 24 that has a refractive index that is selected to be different from that of the fluoropolymer forming tube 20. This forms a raw preform 26. In this illustrated embodiment, a jacket 28, such as a plastic jacket, clamped at one end by a clamp 28a provides an enclosure for preform 26 and closes end 22b, to allow filling the bore 22 with the liquid dopant 24. In an alternative embodiment, the bore 22 has only one opening, rather than two, to allow filling the bore with a liquid dopant without a need for a jacket.

The dopant material 24, similar to the material employed for forming tube 20, is selected to be substantially free of C—H bonds to provide enhanced transparency in the infrared region of the electromagnetic spectrum. One preferred embodiment of the invention employs an oligomer of trifluorochloroethylene as the liquid dopant material 24. The presence of chlorine atoms in this dopant material results in an index of refraction that is greater than that of the fluoropolymer forming the tube 20.

Employing a liquid dopant material has a number of advantages over conventional techniques which insert a rod having a dopant material distributed therein in the bore of a tube, such as the tube 20, and heating the assembly to create a graded distribution of the dopant material. In particular, employing a liquid dopant obviates the need for producing the bore 22 with precise dimensions so that the rod would fit therein, thereby lowering the manufacturing time and cost. Further, employing a liquid dopant material allows utilizing pure dopant material with a concomitant increase of the concentration of the dopant material in the bore 22. Employing a rod may cause defects at the boundary between the rod and the tube upon heat fusion of the rod with the tube. Such defects are less likely to develop when a liquid dopant material is employed. In addition, employing a pure dopant material improves the reproducibility of the refractive gradient among different batches of optical fibers produced in accordance with the method of the present invention.

Figure 4:
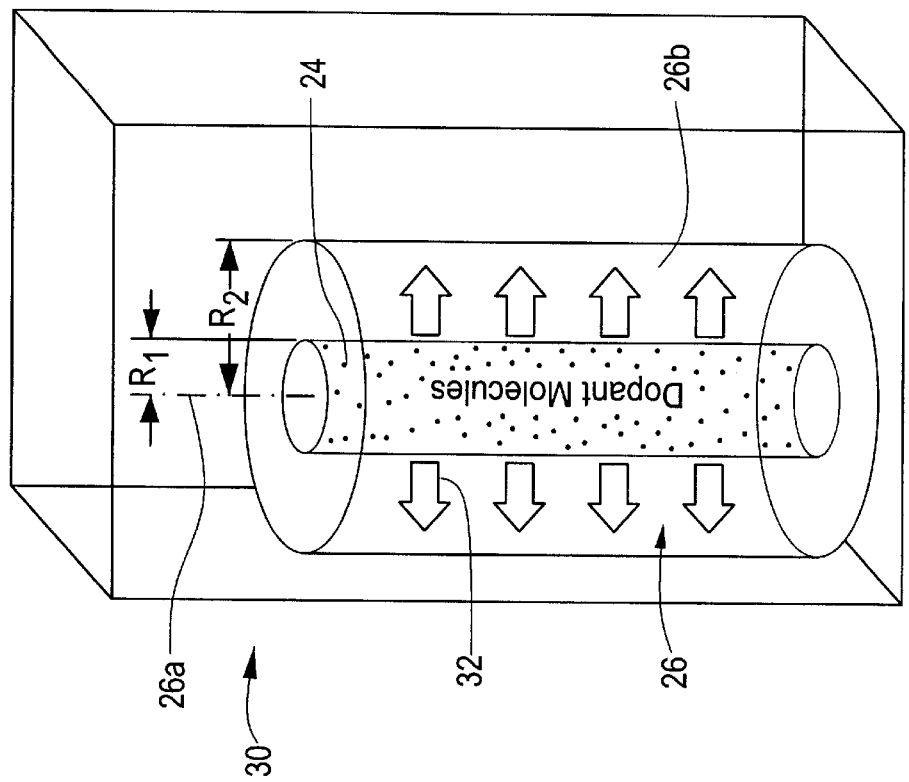
FIG. 4 illustrates the raw preform of FIG. 3 placed within an oven to be heated to a selected temperature for a selected time duration to cause the diffusion of the dopant material to form a finished preform.

FIG. 4 illustrates the heating step. The raw preform 26 is placed in an oven 30, such as a vacuum heated oven, and is heated at a selected temperature for a sufficient duration to cause diffusion of the dopant material in the direction of the radial axis R of the tube 20, and diffusion of the fluoropolymer material of the tube 20 into bore 22. This fuses the bore, thereby producing a finished preform. When a copolymer of PTFE and 2,2-bis(trifuoromethyl)-4,5-difluoro-1,3-dioxol is utilized as the material forming tube 20, and an oligomer of trifluorochloroethylene is employed as the liquid dopant material, the raw preform 26 is preferably maintained at a temperature of approximately 30° C. above the glass transition temperature of the polymer for a sufficient duration, in the range of approximately 200 to 500 hours, to form the finished preform.

The heating of the raw preform causes the diffusion of the dopant material 24, as schematically shown by arrows 32, in the direction of the radial axis R of the tube 20, and diffusion of the fluoropolymer into bore 22. It is known that such a diffusion process is governed by the following differential equation:

$$\frac{\partial C}{\partial t} = D\left(\frac{\partial^2 C}{\partial r^2} + \frac{1}{r}\frac{\partial C}{\partial r}\right) \qquad \text{Eq. (1)}$$

where C(r,t) denotes the concentration of the dopant material at a position r from a central axis 26a of the preform 26 at a time t after the initiation of the heating of the raw preform 26, and D is the diffusion constant which, among other factors, depends on the temperature at which the preform is maintained and the physical properties of the diffusing material. The diffusion coefficient can be approximated to be a constant when the diffusion process occurs above the glass transition of the polymer.

The following boundary and initial conditions can be imposed to solve the above diffusion equation:

$$\frac{\partial C(t, R_2)}{\partial r} = 0 \qquad \text{Eq. (2)}$$

$$C(0,r)=C_0 \text{ for } r<R_1 \qquad \text{Eq.(3)}$$

$$C(0,r)=0 \text{ for } R_1<r<R_2 \qquad \text{Eq.(4)}$$

where $R_1$ is the radius of bore 22, and $R_2$ is the radius of tube 20. Equation (2) indicates that the dopant material is confined at all times within the preform 26; that is, the rate of flow of the dopant material through the outer boundary 26b of the preform 26 is zero. Further, Equation (3) is based on the assumption that the dopant material is initially distributed uniformly within the bore 22 of the tube 20. Finally, boundary Equation (4) indicates that initially, no dopant material is present within the annular space of the tube 20, i.e., the space beyond bore 22.

A full solution of the above diffusion Equation (1) with the associated boundary Equations (2), (3), and (4) is give below:

$$\frac{C(t,r)}{C_0} = \sum_{n=1}^{\infty} \frac{2R_1 J_1\left(\mu_n \frac{R_1}{R_2}\right)}{R_2 \mu_n J_0^2(\mu_n)} J_0\left(\mu_n \frac{r}{R_2}\right) \text{Exp}(-\mu_n^2 Fo) \quad \text{Eq. (5)}$$

where C(t,r) denotes the concentration of the dopant material at a position r from central axis 26a, $C_0$ represents the initial concentration of the dopant material, $J_0$ and $J_1$, are zeroth order and first order Bessel functions, respectively; $R_1$ is the radius of bore 22, $R_2$ is the radius of tube 20, $\mu_n$ represents the roots of the zeroth order Bessel function $J_0$ ($\mu_n$), D is the diffusion coefficient, and $F_o$ is defined as:

$$Fo = \frac{Dt}{R_2^2}$$

Equation (4) indicates that as time passes, the dopant material 24 diffuses into the annular portion of the tube 20. This diffusion process can be better understood by reference to FIG. 5, which illustrates a graph 34 that includes curves 36a, 36b, 36c, and 36d, which schematically illustrate the distribution of the dopant material within preform 26 at different time intervals during heating of preform 26. In particular, curve 36a illustrates that initially, i.e., before heating the raw preform 26, all the dopant material is confined within bore 22 with a uniform distribution. Curves 36b, 36c, and 36d, which are approximately Gaussian and have progressively wider widths, schematically illustrate the distribution of the dopant material upon heating the preform as a function of time. As time passes, the distribution of the dopant material flattens out, with more of the dopant material penetrating into the annular portion of tube 20. Those skilled in the art will appreciate that the actual distribution of the dopant material may be different that those depicted in FIG. 5. Further, those skilled in the art will appreciate that while the dopant material is diffusing into the annular portion of tube 20, there is also a diffusion of the fluoropolymer into the filled bore 22 which, over time, results in fusion of bore 22.

With reference to FIGS. 2 and 4, heating the raw preform 26 causes a flux of the dopant material 32 into the annular portion of tube 20, and further causes a flux of the fluoropolymer forming tube 20 into bore 22, to fuse bore 22 and form a graded distribution of the dopant material within the preform 26. Because, as discussed above, the dopant material 32 is selected to have a refractive index that is different from that of the fluoropolymer forming tube 22, a graded distribution of the dopant material leads to a graded distribution of the refractive index in the finished preform.

The finished preform is drawn to form an optical fiber having a graded refractive index similar to that of the finished preform. FIG. 6 schematically depicts the process of drawing the finished preform to form an optical fiber. In particular, a heater 38 heats a finished preform 40, as it is fed into the space within the heater 38, to a temperature that is selected to be preferably above the glass transition temperature of the finished preform 40. Fiber 42 is drawn from the preform 40. In this illustrated embodiment, a spool 44 collects the optical fiber 42. Because the duration of the drawing process is much shorter than the time needed for the re-distribution of the dopant material through the finished preform by thermal diffusion, the drawn optical fiber 42 has substantially the same graded distribution of the dopant material, and hence substantially the same graded index of refraction as that of the finished preform.

Figure 7A:
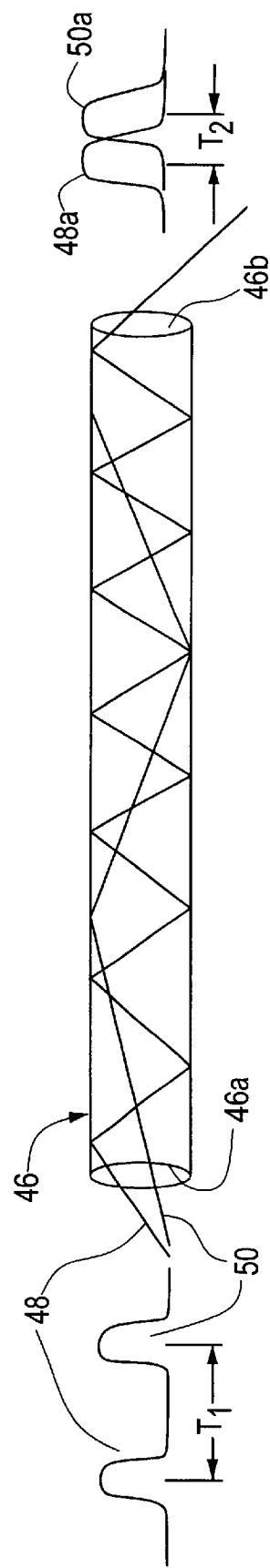
FIG. 7A schematically illustrates the phenomenon of modal dispersion in an optical fiber having a uniform index of refraction.

An optical fiber obtained through the method of the invention having a graded index of refraction provides a number of advantages over optical fibers having a uniform index of refraction. In particular, the graded index of refraction of the optical fiber of the invention ameliorates modal dispersion in a multi-mode operation of the fiber. This advantage of the fiber of the invention can be better understood by reference to FIGS. 7A and 7B. In particular, FIG. 7A schematically illustrates an optical fiber 46 having a uniform index of refraction. Two pulses of light 48 and 50, separated by a time interval $T_1$, and injected at different angles into the optical fiber 46 at one end 46a thereof, traverse different path lengths through the optical fiber 46 before exiting through an opposed end 46b of the fiber 46. The differential in the path lengths traversed by the two beams 48 and 50 causes the time separation of the exiting pulses 48a and 50a to be less than the time separation of the pulses 48 and 50. In fact, in this illustrative example, the exiting pulses 48a and 50a are partially overlapping. Such a modal dispersion in an optical fiber having a uniform index of refraction results in a low bandwidth, thereby limiting the rate of data transmission through the fiber.

Figure 7B:
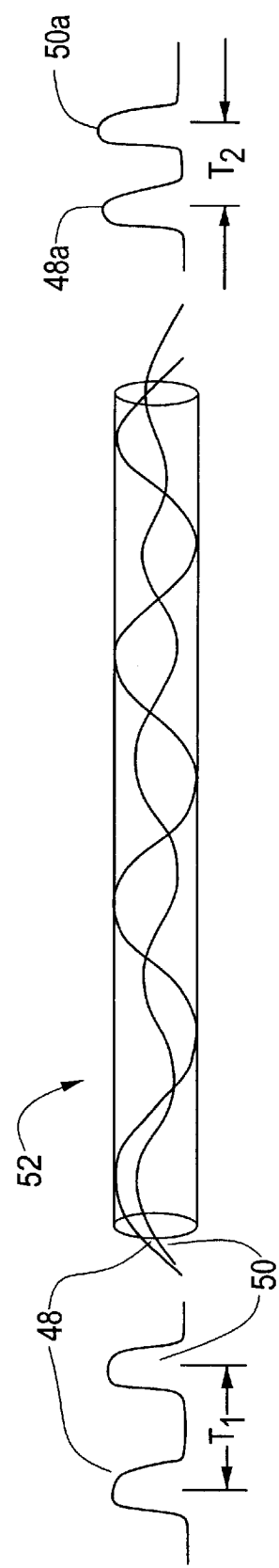
FIG. 7B schematically illustrates that an optical fiber formed according to the teachings of the present invention ameliorates the modal dispersion when the fiber is employed to transmit data in a multi-mode fashion.

An optical fiber according to the present invention having a graded refractive index ameliorates the modal dispersion in a multi-mode operation of the fiber. For example, FIG. 7B shows the two light pulses 48 and 50, separated by a time interval $T_1$, are injected at different angles into an optical fiber 52 produced according to the present invention to have a graded refractive index. The light pulses 48 and 50 sample different portions of the fiber 52, having different indices of refraction, as they traverse through the fiber 52. Thus, although the two light pulses 48 and 50 may traverse different physical pathlengths, they have substantially similar optical pathlengths as they traverse through the fiber 52. Hence, a time separation $T_2$ of the exiting pulses 48a and 50a is substantially similar to the time separation $T_1$ of the entry pulses 48 and 50. The substantial elimination of the modal dispersion advantageously allows transmitting optical information through the optical fiber of the invention in a multi-mode fashion at rates that are substantially faster than those achieved in conventional fibers. For example, an optical fiber produced according to the present invention can be employed to transmit data at a rate of a few Gigabits per second.

In addition, an optical fiber formed according to the method of the invention is chemically stable and is transparent to radiation ranging from ultraviolet to infrared. An optical fiber of the invention can be employed in a variety of applications. For example, such an optical fiber can be installed in a residential or office building to carry data among a variety of instruments and/or appliances. Further, an optical fiber of the invention can be installed in an automobile for transmission of signals to various systems of the automobile.

While the present invention has been described with reference to above illustrative embodiments, those skilled in the art will appreciate that various changes to form and detail may be made without departing from the intended scope of the present invention as defined in the appended claims.

What is claimed is:

1. A method of forming a graded-refractive-index optical fiber, said method comprising the steps of:
   providing a tube of an amorphous fluoropolymer having a first index of refraction, said tube having a longitudinal axis and a radial axis and having a bore extending along said longitudinal axis, said bore having an opening at an end thereof,
   filling said bore, subsequent to said step of providing a tube, with a liquid dopant material having a second index of refraction different from said first index of refraction to a form a raw preform, heating said raw preform at a selected temperature and for a sufficient duration to provide diffusion of said dopant material in the direction of said radial axis to form a selected graded refractive index, said heating further providing a sufficient flux of said fluoropolymer into said filled bore to fuse said bore and form a finished preform having a core with said selected graded refractive index, and drawing said finished preform to form an optical fiber having said selected refractive index.

2. The method of claim 1, wherein the step of providing a tube comprises the step of selecting said bore to be centrally located.

3. The method of claim 1, wherein the step of providing a tube comprises the step of selecting said bore to include two openings at its opposed ends.

4. The method of claim 3, further comprising a step of placing said tube in a plastic jacket before said step of filling and clamping an end of said jacket to close one of said two openings to allow filling said bore.

5. The method of claim 1, wherein said step of providing a tube comprises the step of selecting said amorphous fluoropolymer to include e a copolymer of polytetrafluoroethylene and 2,2-bis(trifluoromethyl)-4,5-difluoro-1,3-dioxol.

6. The method of claim 1, wherein said step of filling further comprises the step of selecting said liquid dopant to include an oligomer of tnifluorochloroethylene.

7. The method of claim 1, wherein said step of providing a tube further comprises the step of selecting said bore to have a diameter in a range of approximately 1 to 2 millimeters.

8. The method of claim 5, wherein said heating step comprises the s step of raising the temperature of said raw preform to approximately 30° C. above the glass transition of the fluoropolymer.

9. The method of claim 8, wherein said step of heating further comprises the step of selecting said sufficient duration to be in a range of approximately 200 to 500 hours.

10. A method for forming a transparent fiber having a graded-refractive index, said method comprising the steps of:

providing a tube of an amorphous fluoropolymer having a first index of refraction, said tube having a longitudinal axis and a radial axis and having a bore extending along said longitudinal axis, said bore having an opening at an end thereof, filling said bore, subsequent to said step of providing a tube, with a liquid dopant material having a second index of refraction different from said first index of refraction to form a raw preform, and heating said raw preform at a selected temperature and for a sufficient duration to provide diffusion of said dopant material in the direction of said radial axis to form a selected graded refractive index, said heating further providing a sufficient flux of said fluoropolymer into said filled bore to fuse said filled bore and form a transparent element having a core with said graded refractive index, and drawing said transparent element to form a transparent fiber having said graded refractive index.

11. The method of claim 10, wherein said step o f providing a tube further comprises the step of selecting said amorphous fluoropolymer to include a copolymer of tetrafluoroethylene and 2,2-bis(trifluoromethyl)-4,5-difluoro-1,3-dioxol.

12. The method of claim 10, wherein said step of filling said bore further comprises the step of selecting said liquid dopant to include trifluorochloroethylener.

13. A method of forming a graded-refractive index optical fiber, said method comprising the steps of:

extruding an amorphous fluoropolymer having a first index of refraction to form a preform having a longitudinal axis and a radial axis and having a bore extending along the longitudinal axis, said bore having an opening at an end thereof, filling said bore, subsequent to said extruding step, with a liquid dopant material having a second index of refraction different from said first index of refraction to form a raw preform, heating said raw preform at a selected temperature and for a sufficient duration to provide diffusion of said dopant material in the direction of said radial axis to form a selected graded refractive index, said heating further providing a sufficient flux of said fluoropolymer into said filled bore to fuse said filled bore and form a finished preform having a core with said graded refractive index, and drawing said finished preform to form an optical fiber having said graded refractive index.

14. A method for forming a transparent fiber having a graded-refractive index, said method comprising the step of:

providing a tube of an amorphous fluoropolymer having a first index of refraction and having substantially no free C—H bonds, said tube having a longitudinal axis and a radial axis and having a bore extending along said longitudinal axis, said bore having an opening at an end thereof, filling said bore, subsequent to said step of providing a tube, with a liquid dopant material having a second index of refraction and having substantially no free C-H bonds to form a raw perform, heating said raw preform at a selected temperature and for a sufficient duration to provide diffusion of said dopant material in the direction of said radial axis to form a selected graded-refractive index, said heating providing a sufficient flux of said fluoropolymer into said filled bore to fuse said bore and form a finished preform having a core with said graded refractive index, and drawing said finished preform to form an optical fiber having said graded refractive index.

15. A method for forming a transparent optical fiber having a graded-refractive index, said method comprising the steps of:

providing a tube of an amorphous fluoropolymer having a first index of refraction and having substantially no free C—H bonds, said tube having a longitudinal axis and a radial axis and having a bore extending along said longitudinal axis, said bore having an open ing at an end thereof, filling said bore, subsequent to said step of providing a tube, with a liquid dopant material having a second index of refraction different from said first index of refraction and having substantially no free C—H bonds to form a raw preform, heating said raw preform at a selected temperature and for a sufficient duration to provide diffusion of said dopant material in the direction of said radial axis to form a selected graded refractive index, said heating further providing a sufficient flux of said fluoropolymer into said filled bore to fuse said filled bore and form a transparent optical element having a core with said graded refractive index, and drawing said transparent element optical element to generate an optical fiber capable of multi-modal transmission of optical data.

16. A method for forming a graded-refractive index optical fiber, said method comprising the steps of extruding an amorphous fluoropolymer having a first index of refraction and having substantially no free C—H bonds to form a preform having a longitudinal axis and a radial axis and having a bore extending along the longitudinal axis, said bore having an opening at an end thereof, filling said bore, subsequent to said extruding step, with a liquid dopant material having a second index of refraction different from said first index of refraction and having substantially no free C—H bonds to form a raw preform, heating said raw preform at a selected temperature and for a sufficient duration to provide diffusion of said dopant material in the direction of said radial axis to form a selected refractive index, said heating further providing a sufficient flux of said fluoropolymer into said filled bore to fuse said filled bore and form a finished preform having a core with said graded refractive index, and drawing said finished preform to form an optical fiber having said graded refractive index.

* * * * *